T. W. BARBER.
METHOD FOR THE RECOVERY OF FATTY AND OTHER MATTERS FROM LIQUIDS.
APPLICATION FILED DEC. 8, 1915.
1,251,621.
Patented Jan. 1, 1918.
2 SHEETS—SHEET 1.
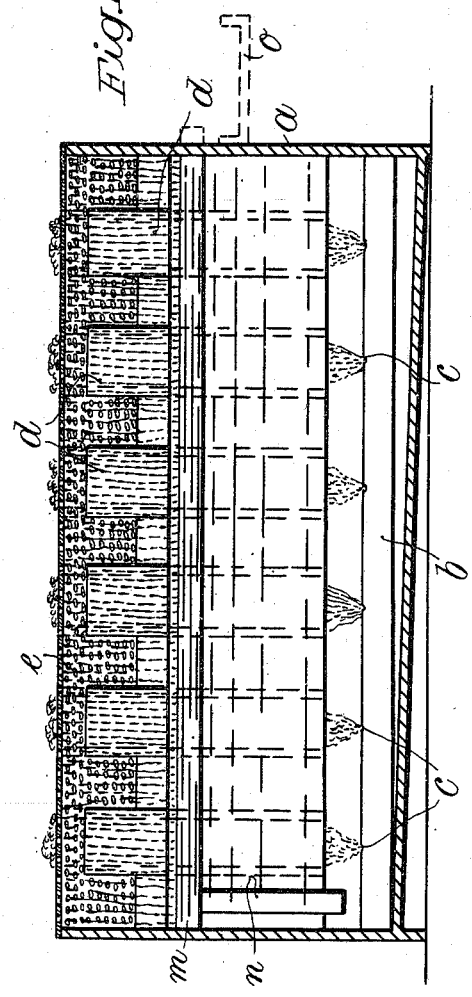
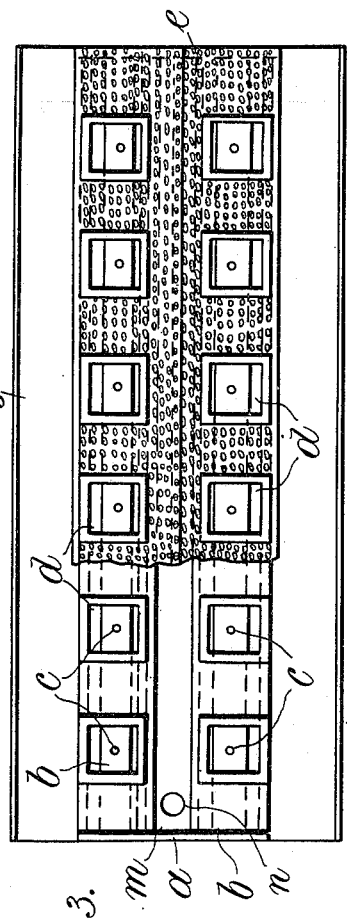
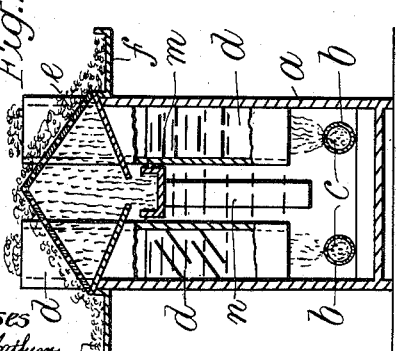
Inventor
Thomas Walter Barber,

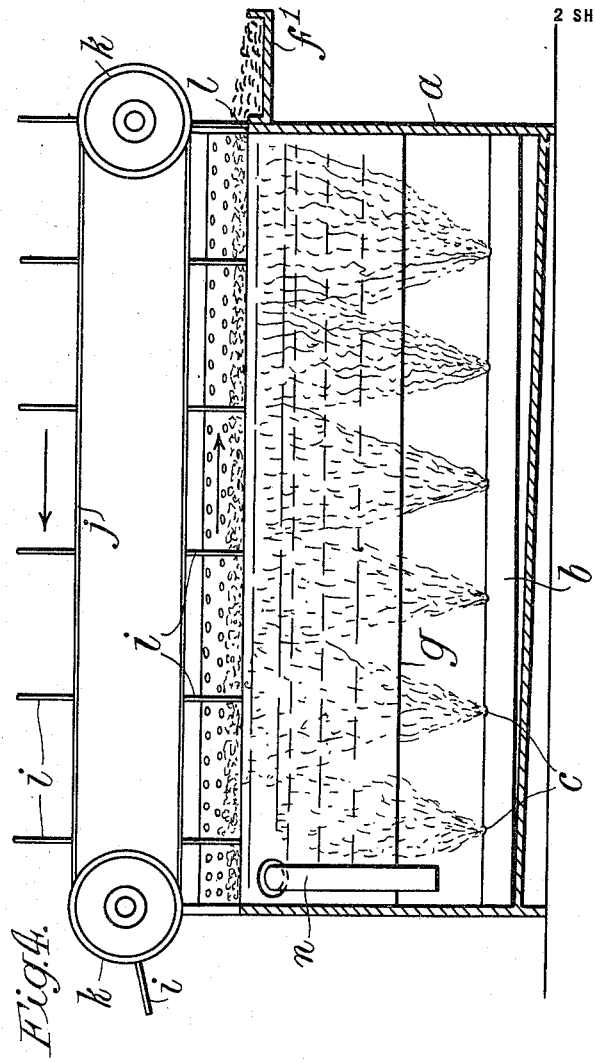
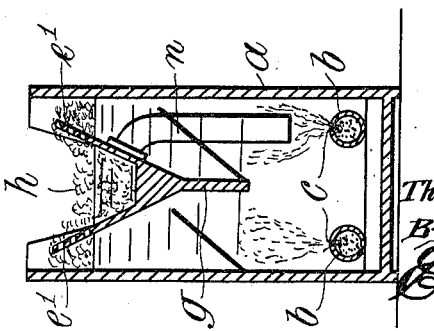

UNITED STATES PATENT OFFICE.

THOMAS WALTER BARBER, OF WESTMINSTER, LONDON, ENGLAND.

METHOD FOR THE RECOVERY OF FATTY AND OTHER MATTERS FROM LIQUIDS.

1,251,621.　　　　　Specification of Letters Patent.　　Patented Jan. 1, 1918.

Application filed December 8, 1915. Serial No. 65,782.

*To all whom it may concern:*

Be it known that I, THOMAS WALTER BARBER, a subject of His Majesty the King of England, residing at Westminster, in the county of London, Kingdom of England, have invented certain new and useful Improved Methods for the Recovery of Fatty and other Matters from Liquids, of which the following is a specification.

This invention relates to an improved method for the recovery of fatty and other matters from liquids.

The invention refers to the treatment of wool washing liquids for the recovery of wool fat (lanolin) or fats of a similar chemical nature.

Heretofore various methods have been proposed for the treatment of such liquids for the purpose of recovering the total fats and for preserving the liquid for re-use, but in all cases chemical action of some kind has been relied upon either for neutralizing or treating the alkaline liquid and assisting the separation, or for the recovery of the fat from the separated portion. In these cases in which air has been used as an agent it has performed the function of a stirrer or agitator only.

For instance in one process it has been proposed to run the liquid into a tank fitted with perforated pipes through which air is admitted so as to agitate the liquid and form a froth or foam which contains the mixed fatty matters in a concentrated condition. This foam is removed by means of scrapers or an endless band and, if it is desired to recover the fats, subsequently neutralized by treatment with sulfuric acid, the mixed fatty matters in the resulting magna being recovered either by pressure or by means of solvents or other well known means.

Now according to the present invention I recover or separate the wool fat (lanolin) only, from the wool washing liquid in a direct manner and without the use of chemical agents by means of a single mechanical process which consists in subjecting the liquid to the action of the impact of air or gas preferably operating in the form of fine jets and in conjunction with baffles as hereinafter described, the said process leaving the alkali and soap fats (if soap has been used) in the liquor chemically unchanged. The air or gas is introduced in such a manner as to utilize its impinging action on the liquor and the fatty matters contained therein.

In the woolen industry the raw wool is usually first subjected to a washing process in which the dirt, fatty and other matters adhering to the fiber are removed. The dirt settles out of the washing liquid, but the fat usually remains in it, either in the condition of an emulsion or in colloidal solution, and the potash and other matters of a less important character pass into true solution.

In carrying out the present invention the waste wool washing liquid is first preferably allowed to settle whereby the heavier dirt is removed. It is then subject to the action of air or other gas under pressure, in such a manner that the gas escapes into the liquid within suitably formed chambers causing the latter to be broken up into a fine state of division and finally to escape at suitably located orifices in the form of bubbles. In this way the fine colloid particles are so agglomerated that they can be directly recovered without the agency of chemicals.

The invention is hereinafter described with reference to the accompanying drawings in which:—

Figure 1 is a sectional side elevation of one form of trough,

Fig. 2 is a sectional end elevation thereof,

Fig. 3 is a corresponding plan view.

Fig. 4 is a sectional side elevation of one alternative arrangement of trough; and Fig. 5 is a sectional end elevation.

As shown in Figs. 1 to 3 of the drawings the apparatus for effecting this action may consist of a trough shaped vessel *a* into which the liquid may be fed at a predetermined rate. Near the lower portion of the vessel, pipes *b* are introduced, provided with fine orifices *c* along their length. Above each orifice, a tubular chamber *d* is located in such a manner that the air or gas escaping from the orifices *c* in the before mentioned tubes may rise into the chamber, drawing the liquid in the trough *a* with it, in the form firstly, of an intimate mixture of gas and liquid, and finally in the form of bubbles. These chambers *d* may be arranged as shown with their axes vertical or approximately vertical, and the gas and liquid entering at their lower extremities, will then pass in an upward direction through them. They may be provided with perforated or other suitably disposed baffles as shown in order to assist in the atomizing of the liquid. The pressure of the gas is adjusted so that the broken up and gasified liquid emerges from the top of the chambers $d$ with sufficient force to flow out of the chambers in the form of bubbles. A perforated plate $e$ may be provided surrounding the upper portion of the tubular chambers and the bubbles will then flow out of the upper ends of the chambers on to this plate. The wool fat is retained on the plate $e$ and is delivered into the troughs $f$ provided for its reception.

The liquid passes back through the holes in to the collecting trough $m$ and is or may be returned to the trough $a$ through the pipes $n$ for further treatment or it may be passed into a second similar trough to undergo a continuation of the process or may be discharged in to the waste channel $o$.

A number of these troughs $a$ can be arranged in series so that a considerable quantity of liquid may be dealt with. The period during which it is under the action of the gas can be varied to suit the characteristics of the liquid.

The liquid as it leaves the trough or troughs $m$ will contain the potash and/or other alkalis which have been used for the washing of the wool and also the potash extracted from the wool fiber in the washing process. This alkali will be in the same chemical condition that it was in when introduced for the purpose of washing, and consequently will be available for use again in the washing process. A precipitant such as lime or clay may be used to further clarify the liquid issuing from the troughs.

By this method of treatment the wool fat is removed without the use of acids which are the chief agents used in ordinary recovery processes. Not only is this the case but the alkalis instead of being converted into forms which are of no further service for the washing of the wool or other material, remain in their original form, and consequently are available for further service. If these alkalis are to be recovered for other purposes simple evaporation will effect their separation from the liquid. The sedimented solids may conveniently be recovered and converted into manure.

In the modified form of apparatus shown in Figs. 4 and 5 the trough $a$ is provided as before with perforated pipes $b$, and is divided longitudinally by means of a central partition $g$ which is connected at its upper edge to the converged ends of a pair of plates $e'$ forming between them a central trough $h$ into which the liquid bubbles over from the two sides. The liquid may then pass back into the main trough $a$ for re- treatment as before through perforations in the plates $e'$ or by way of a pipe $n$ as shown. The wool fat is retained and floats on the surface of the liquid in the trough $h$ and may conveniently be removed by means of plates $i$ provided on an endless chain or belt $j$ passing over rollers $k$, being pushed by them over a weir $l$ at the end of the trough into another trough or receptacle $f'$ as shown.

What I claim as new and desire to secure by Letters Patent of the United States is:—

1. The method of separating and recovering wool fat, (lanolin), or other fats of a similar chemical nature, which consists in forcefully projecting air in fine streams through wool washing liquid and against obstructions in the liquid in the paths of the air streams to agglomerate fine particles of wool fat contained in the liquid and separate such fine particles of wool fat from the liquid in a condition to remain on the surface of the liquid.

2. The method of separating and recovering wool fat, (lanolin), or other fats of a similar chemical nature, which consists in subjecting wool washing liquid free from acid to the forceful impact action of fine streams of air or gas under pressure entering and directed through the liquid and at the same time impeding the passage of the gas streams through the liquid by obstructions, whereby the fine particles of wool fat are separated from the liquid and agglomerated and localized to the surface of the liquid.

3. The method of separating and recovering wool fat, (lanolin), or fats of a similar chemical nature, which consists in forcing fine streams of air or gas under pressure through circumscribed bodies of wool washing liquid free from acid, with the passage of the fine streams of gas through the liquid impeded by baffles and with the pressure of the gas such as to agglomerate the fine particles of wool fat and localize them to the surface of the liquid.

4. The method of separating and recovering wool fat, (lanolin), or fats of a similar chemical nature which consists in directing fine streams of air or gas through wool washing liquid free from acid with the passage of the streams of gas through the liquid impeded by interposed baffles in the body of liquid, whereby the fine particles of wool fat are agglomerated and localized on the surface of the liquid, and causing the agglomerated wool fat to overflow from the surface of the liquid upon draining means for the automatic separation of the wool fat by drainage from the washing liquid and fats of other nature contained therein.

5. The method of recovering wool fat, (lanolin), or fats of a similar chemical nature which consists in directing fine streams of air or gas under pressure through tortuous paths in the liquid, whereby the wool fat is broken up into minute particles and agglomerated at the surface of the liquid by impact by the gas streams and against impediments offered by the tortuous passage, and the broken up wool fat is agglomerated and localized on the surface of the liquid in a condition to remain thereat while other matters and fats of other nature contained in the liquid drain back thereinto.

In testimony whereof I have hereunto signed by name to this specification.

THOMAS WALTER BARBER.